US005682747A

United States Patent [19]

Brown et al.

[11] Patent Number: 5,682,747

[45] Date of Patent: Nov. 4, 1997

[54] GAS TURBINE COMBUSTOR HEAT SHIELD OF CASTED SUPER ALLOY

[75] Inventors: Daniel D. Brown, Fairfield, Ohio; Marlin S. Brueggert, Lebanon, Ind.; Ronald T. Murach, Mason, Ohio; Kevin W. Raabe, Cincinnati, Ohio; Joseph G. Sabato, Hamilton, Ohio

[73] Assignee: General Electric Company, Cincinnati, Ohio

[21] Appl. No.: 627,811

[22] Filed: Apr. 10, 1996

[51] Int. Cl.[6] .......... F02C 1/00

[52] U.S. Cl. .......... 60/746; 747/752

[58] Field of Search .......... 60/39.02, 747, 60/746, 733, 752, 753, 756

[56] References Cited

U.S. PATENT DOCUMENTS

| | | | |
|---|---|---|---|
| 3,714,778 | 2/1973 | Howald | 60/746 |
| 4,518,442 | 5/1985 | Chin | 148/11.5 N |
| 4,605,452 | 8/1986 | Gemma et al. | 148/404 |
| 4,714,101 | 12/1987 | Terkelsen | 164/122.2 |
| 5,062,469 | 11/1991 | Monte et al. | 164/122.2 |
| 5,220,795 | 6/1993 | Dodds et al. | 60/752 |
| 5,285,632 | 2/1994 | Halila et al. | 60/39.31 |
| 5,323,604 | 6/1994 | Ekstedt et al. | 60/39.36 |
| 5,375,420 | 12/1994 | Falls et al. | 60/747 |
| 5,528,896 | 6/1996 | Alary et al. | 60/747 |
| 5,630,319 | 5/1997 | Schilling et al. | 60/747 |

*Primary Examiner*—Timothy Thorpe
*Assistant Examiner*—Ted Kim
*Attorney, Agent, or Firm*—Andrew C. Hess; Wayne O. Traynham

[57] ABSTRACT

A heat shield for a gas turbine engine combustor of the type composed of multiple annular stages. The heat shield is particularly adapted for use in a middle stage disposed between radially inward and outward stages of a multistage combustor, and configured to form centerbodies that isolate the middle stage from the other stages of the combustor. The heat shield is composed of an annular array of single crystal superalloy segments. To achieve acceptable levels of durability for the superalloy segments, their primary and secondary crystal orientations are controlled to achieve a balance between the ability to withstand thermally-induced stresses and those stresses induced by high levels of acoustic energy, particularly those high levels attained as a result of a combustor operating with lean fuel/air ratios.

20 Claims, 2 Drawing Sheets

GAS TURBINE COMBUSTOR HEAT SHIELD OF CASTED SUPER ALLOY

This invention relates to combustion systems of gas turbine engines. More particularly, this invention is directed to an improved heat shield for use in a multistage annular combustor, in which the heat shield exhibits enhanced durability under lean combustion conditions that cause stresses resulting from high acoustic energy, in addition to stresses induced by temperature gradients in the heat shield.

BACKGROUND OF THE INVENTION

Conventional gas turbine engines for aerospace and industrial applications typically have an annular-shaped combustor equipped with a single annular array of air/fuel mixers. Splashplates surround the mixers to prevent excessive dispersion of the fuel/air mixture in the primary combustion zone immediately downstream of each mixer, and introduce cooling air directly into the primary combustion zones. Environmental regulations have resulted in stricter emission standards that require gas turbine engines to reduce pollutant emissions. Pollutants such as nitrogen oxide emissions, referred to as "NOx," are produced if temperatures are sufficiently high to cause oxidation of nitrogen in the air during the combustion process.

Significant reductions in gas turbine emissions of NOx have been attained by reducing the flame temperature in the combustor, employing multiple segregated annuli of air/fuel mixers to enable a staged combustion operation, and minimizing the introduction of cooling flow into the primary combustion zone of each mixer. An example of a combustor 10 that achieves the above is illustrated in FIG. 1. The combustor 10 can be termed a triple annular combustor due to the presence of three concentric domes **12*a*, 12*b* and 12*c*, each of which is equipped with an annular array of air/fuel mixers 14*a*, 14*b* and 14*c*. Conventionally, the central dome 12*b* serves as the pilot stage section, and operates under relatively low temperature and low fuel/air ratio conditions during engine idle operation. The remaining domes 12*a* and 12*c*** are main stage sections that are fueled and cross-ignited from the pilot stage to operate at higher temperatures and fuel/air ratios. To reduce the flame temperature, the pilot and main stages preferably operate with a lean fuel/air ratio, which as used herein is indicative of fuel/air mixtures containing more air than is required to fully combust the fuel in the mixture.

Finally, heat shields **16*a*, 16*b* and 16*c* are provided around each mixer 14*a*–14*c*. In the past, each heat shield 16*a*–16*c* has been formed as a one-piece annular body, though segmented ceramic heat shields have been developed as taught in U.S. Pat. No. 5,323,604 to Ekstedt et al. and U.S. Pat. No. 5,375,420 to Falls et al., both of which are commonly assigned with the present invention. The heat shields 16*a* and 16*c* located in the radially outward and inward domes 12*a* and 12*c*, respectively, are each formed to have an endbody 18 that insulates the outer and inner liners 22*a* and 22*b* of the combustor 10 from the flame in their respective primary combustion zones 24*a*, 24*b* and 24*c*. The heat shield 16*b* located at the center dome 12*b* (pilot stage) is formed to have opposing centerbodies 20*a* and 20*b* that serve to isolate the pilot stage from the main stages of the outer and inner domes 12*a* and 12*c*, respectively. The intended purpose of the centerbodies 20*a* and 20*b* is to isolate the pilot stage from the main stages in order to ensure combustion stability of the pilot stage at various operating points. In addition, the endbodies 18 and the centerbodies 20*a* and 20*b* preferably serve to direct cooling air downstream of the primary combustion zones 24*a*–24*c* of the mixers 14*a*–14*c*. As shown, the latter function can be accomplished by providing cooling passages 26 within the endbodies 18 and centerbodies 20*a* and 20*b***.

With the above configuration, lower flame temperatures can be achieved as a result of the combustor 10 being composed of segregated annuli of air/fuel mixers **14*a*–14*c* that enable staged combustion, with each stage operating at lean fuel/air ratios. Reduced cooling flow in the primary combustion zones 24*a*–24*c* is achieved with the passages 26 in the endbodies 18 and centerbodies 20*a* and 20*b*, which direct cooling flow downstream of the primary combustion zones 24*a*–24*c*. Notably, the centerbodies 20*a* and 20*b* serve the traditional role of a heat shield, namely, providing segregation of the adjacent annular arrays of mixers 14*a*–14*c***.

When optimizing the design of the heat shield **16*b*, consideration must be given to durability in terms of the ability to withstand high operating temperatures and thermally-induced stresses, the natural frequency of the design in order to avoid acoustic frequencies, and the maintainability and castability of the design. In particular, the complex geometry required of the heat shield 16*b*, in combination with the thermally hostile environment of a turbine engine combustor, renders the shield 16*b* exposed to a complex 3-D stress field. Furthermore, thermal gradients across the heat shield 16*b* tend to be promoted with the staged operation of the combustor 10, in which adjacent arrays of air/fuel mixers 14*a*–14*c* may operate at different temperatures due to different amounts of fuel being combusted. A final problem is the complex stresses induced by acoustic energy caused by the combustor 10 being operated with a lean fuel/air ratio. This acoustic energy, which is generally the result of flame instability at low fuel/air ratios, significantly increases the stresses in the heat shields 16*a*–16*c* and further complicates the 3-D stress field. Unfortunately, the design enhancements that promote durability with respect to thermal gradients, particularly minimizing stresses in the fillet region between the base of the heat shield 16*b* and the centerbodies 20*a* and 20*b***, can result in higher stresses induced by acoustic energy.

From the above, it can be appreciated that stress considerations impede the optimization of geometries for heat shields used in the combustors of gas turbine engines. Accordingly, what is needed is a heat shield that is configured and processed to meet both the functional and durability requirements for such applications.

SUMMARY OF THE INVENTION

It is an object of this invention to provide an improved heat shield for a gas turbine engine combustor, in which the heat shield is configured and processed to promote the structural durability of the heat shield under conditions where both thermal gradients and acoustic energy levels result in a complex 3-D stress field within the shield.

It is another object of this invention that such a heat shield has an annular segmented construction composed of individual heat shield members, each of which is formed as a single crystal superalloy casting whose physical configuration serves to promote the durability of the heat shield with respect to stresses induced by high acoustic energy levels.

It is a further object of this invention that each heat shield member is cast such that its crystal orientation serves to promote the durability of the heat shield with respect to stresses induced by thermal gradients, while maintaining acceptable frequency response characteristics.

It is yet another object of this invention that secondary crystal orientation of each heat shield member is particularly controlled to reduce stress levels in fillet regions of the heat shield member in order to enhance the durability of the member with respect to thermal stresses, yet is also controlled to maintain acceptable frequency response characteristics.

The present invention provides a heat shield for a gas turbine engine combustor of the type composed of multiple annular stages, such as the combustor 10 represented in FIG. 1. The heat shield is particularly optimized for use in a middle stage of a multistage combustor, and therefore disposed between radially inward and outward stages. In this location, the heat shield is configured to include two centerbodies that isolate the middle stage from the remaining stages of the combustor. However, this invention is generally applicable to heat shields for any stage of a combustor, i.e., radially-inward and outward stages also, as will become apparent.

In accordance with this invention, the heat shield is composed of an annular array of heat shield members that are assembled within the combustor to form an annular segmented heat shield. For convenience, each heat shield member will be described with reference to the radial and axial directions of the combustor, such that each member has a radial axis roughly bisecting the member, and an axial axis normal to and intersecting the radial axis of the member. As a heat shield for the middle stage of a multistage combustor, each heat shield member includes two wall portions that, when the members are assembled, form two concentric annular segmented centerbodies that separate the middle stage of the combustor from two radially-adjacent stages of the combustor. If used as a heat shield for a radially-inner or outer stage, only one wall portion would be required such that, when the members are assembled, a single concentric annular segmented endbody insulates the stage from the inner or outer liner of the combustor. Because the present invention is directed to optimizing a heat shield for use in a middle stage of a multistage combustor, which is subject to a more complex stress field, the following discussion will be generally directed to a heat shield member having two wall portions.

Heat shield members of this invention have complex geometries in order to fulfil their multiple roles—namely, the delivery of cooling flow downstream of the combustors primary combustion zones, and as heat shields to provide segregation of adjacent annular arrays of air/fuel mixers. Each heat shield member generally has a planar base portion lying in its radial plane. The base portion has a radially-outward first end, a radially-inward second end, and opposing lateral edges. The base portion further includes an opening disposed between the first and second ends, with the opening being sized to circumscribe an air/fuel mixer of the combustor. The wall portions extend in the axial direction from the radially-inward and outward ends of the base portion so as to be substantially normal to the base portion, with fillets being present between each wall portion and its adjoining region of the base portion. The wall portions preferably have complementary arcuate shapes to achieve the desired annular shape for concentric segmented centerbodies.

The complicated geometries of the heat shield members render them susceptible to both thermally and acoustically-induced stresses. Because superalloy materials have generally been incapable of achieving acceptable durability levels, prior art heat shields of the type described above have generally been produced from ceramic materials in order to withstand the high temperatures within a gas turbine engine combustor. However, in contrast to the prior art, the heat shield members of this invention are single crystal superalloy casting. Importantly, it has been determined that to achieve acceptable levels of durability for a superalloy heat shield member, the primary and secondary crystal orientations of the casting must be controlled to achieve a balance between the ability to withstand thermally-induced stresses and those stresses induced by high levels of acoustic energy, particularly those high levels attained as a result of a combustor operating with lean fuel/air ratios.

Throughout this discussion, the primary crystal orientation will be identified relative to the axial direction of the heat shield member, while the secondary crystal orientation is normal to the primary crystal orientation and in the plane of the base portion. According to this invention, the primary crystal orientation of the single crystal superalloy casting is controlled to promote mechanical and thermal properties along the axial length of the wall portions. Preferably, the primary crystal orientation is parallel to the wall portions, and therefore parallel to the axial axis of the heat shield member, to promote manufacturability, though it is foreseeable that the primary crystal orientation could be angularly offset from the axial axis in order to further optimize the properties of the heat shield member. In contrast, the secondary crystal orientation is intentionally offset in either direction from the radial axis of the heat shield member. Generally, the secondary crystal orientation can be up to about thirty degrees from the radial axis of the heat shield member, with a preferred offset angle being about fifteen degrees.

According to this invention, an offset secondary crystal orientation has been determined to particularly reduce stress levels in the fillet regions of the heat shield member, yet maintain acceptable frequency response characteristics for the heat shield, such that the overall durability of the heat shield is superior to prior art one-piece and segmented heat shields.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
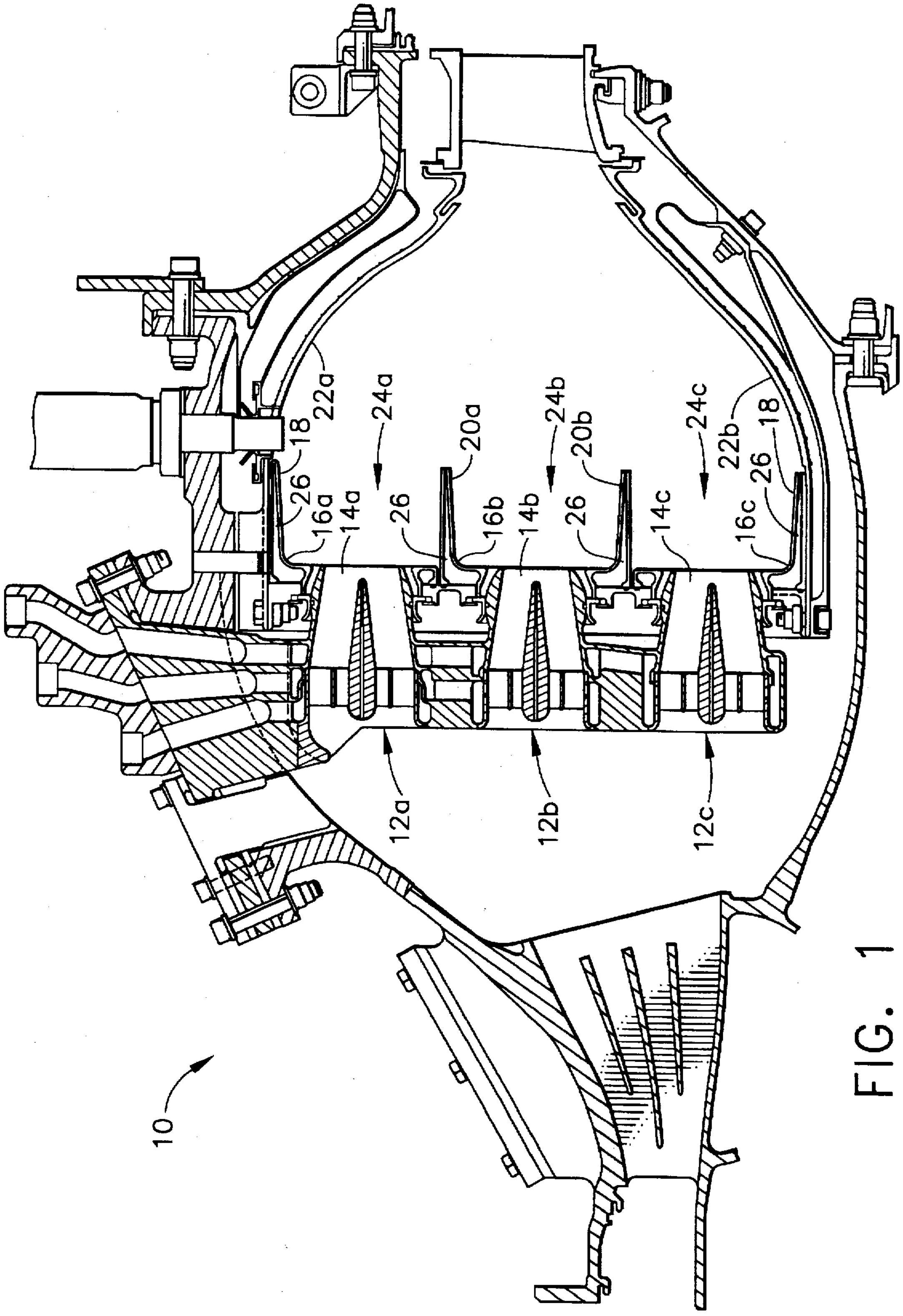
FIG. 1 is a cross sectional view of a triple annular combustor of a gas turbine engine, in which heat shields in accordance with this invention are employed at the radially-inward, middle and radially-outward annular stages of the combustor.
Figure 3B:
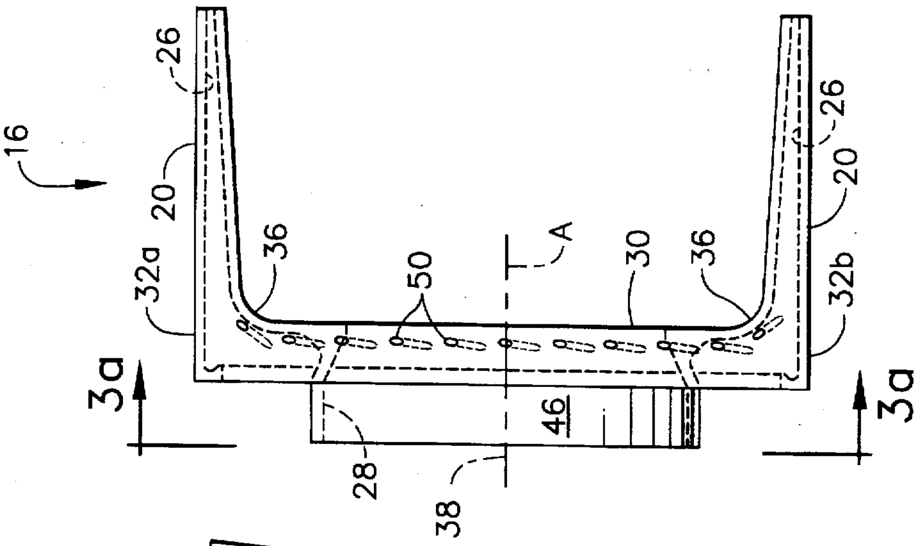
Figure 3A:
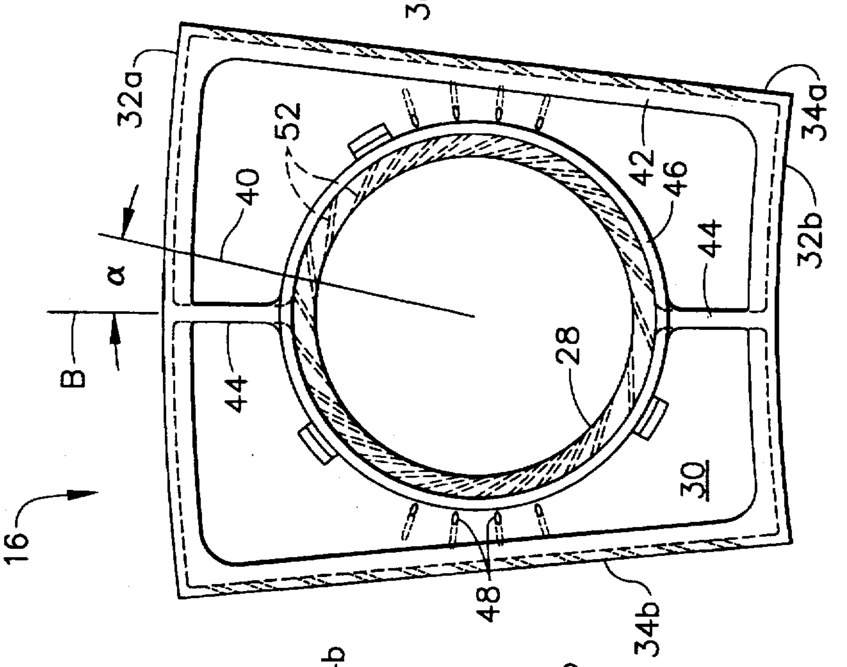
Figure 2:
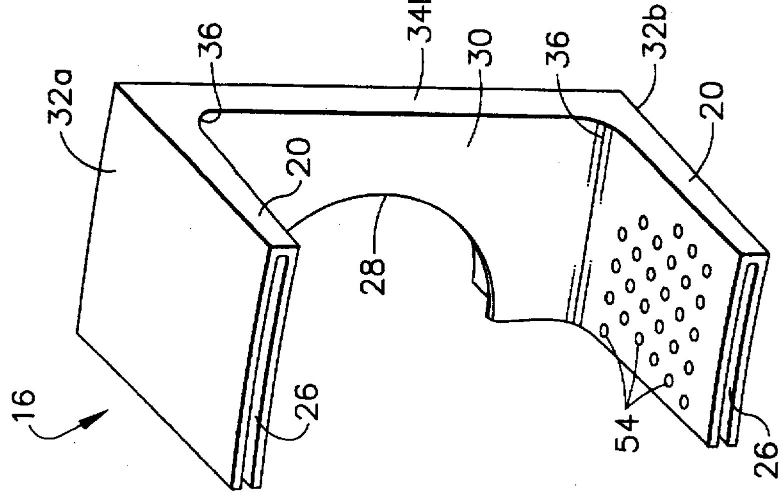
FIG. 2 is a partial perspective view of a heat shield segment for the middle annular stage in accordance with a preferred embodiment of this invention; and FIGS. **3*a* and 3*b* are rear and side views, respectively, of the heat shield segment of FIG. 2**.

FIGS. 2, **3*a* and 3*b* illustrate a heat shield 16 in accordance with the teachings of the present invention, and of the type adapted for use within gas turbine engine combustors of the type represented in FIG. 1. The heat shield 16 shown in FIGS. 2, 3*a* and 3*b* is one segment of the annular segmented heat shield 16*b* at the center dome 12*b* (pilot stage) of the combustor 10 shown in FIG. 1. As is apparent from FIG. 1, the heat shield 16 is formed to have an opening 28 through which a mixture of air and fuel is discharged from an air/fuel mixer 14b, with opposing centerbodies 20 that serve to form the annular segmented centerbodies 20a and 20b that isolate the middle (pilot) stage from the main stages of the radially-outward and radially-inward domes 12a and 12c, respectively. While the present invention will be discussed with respect to the heat shield 16 as it is shown configured for use in the middle stage of a multistage combustor, this invention also encompasses heat shields configured for use in the outer and inner domes 24a and 24c of the combustor 10**, as will become apparent to those skilled in the art.

In accordance with this invention, the heat shield 16 is of the type used in a combustor 10 that operates with a fuel/air ratio that is lean so as to reduce NOx emissions. However, as a consequence of flame instability associated with a lean fuel-air mixture, high acoustic energy is produced that is detrimental to the durability of the heat shield 16. Accordingly, the resonant frequency of the heat shield 16 must differ from the excitation frequency of the acoustic energy. Traditionally, design practice has been to configure heat shields to have a resonant frequency about 15% above the excitation frequency. Inherently, the lengths of the centerbodies 20 are based on a balance between the functional requirements of the centerbodies 20 and the resultant natural frequency of the heat shield 16.

From the perspective of their location within the combustor 10, each heat shield 16 can be described with reference to the radial and axial directions of the combustor 10. As such, the member 16 is shown in FIGS. 3a and 3b to have an axial axis A that defines the axis of the opening 28, and a radial axis B normal to and intersecting the axial axis A and roughly bisecting the member 16. The heat shield 16 is shown in FIG. 2 as being cross-sectioned by a plane through its axial and radial axes A and B.

As seen in FIGS. 2, 3a and 3b, the heat shield 16 has a planar base 30 that lies in the radial plane of the heat shield 16. The base 30 has a radially-outward first end 32a, a radially-inward second end 32b, and opposing lateral edges 34a and 34b extending between the first and second ends 32a and 32b. The lateral edges 34a and 34b are not parallel to each other, but diverge in the radial direction as shown in FIG. 3a in order to enable a number of heat shield members 16 to be assembled in an annular array that forms an annular segmented heat shield. FIG. 3a shows the surface of the base 30 that faces away from the combustion zone 24b when the heat shield 16 is installed in the combustor 10 shown in FIG. 1. The base 30 includes a raised rim 42 along its outer perimeter and a pair of radial ribs 44 along the radial axis B of the heat shield 16. The rim 42 and ribs 44 serve to raise the natural frequency and reduce the peak vibratory stress of the heat shield 16. The opening 28 is preferably intermediate the first and second ends 32a and 32b, and is bisected by the radial axis B of the heat shield 16 as indicated in FIG. 3a. As noted above, the axis of the opening 28 coincides with the axial axis A of the heat shield 16 and is normal to the radial plane of the member 16, as shown in FIG. 3b. The opening 28 is circumscribed by a raised rim 46, as shown the Figures.

The centerbodies 20 extend in the axial direction from the ends 32a and 32b of the base 30 so as to be substantially normal to the base 30, with a fillet 36 being present between each centerbody 20 and the adjoining region of the base 30. The centerbodies 20 are formed to have complementary arcuate shapes to achieve the desired annular shape of the segmented centerbodies 20a and 20b shown in FIG. 1. In this configuration, the centerbodies 20 are adapted to serve as a splashplate for the air/fuel mixer 14b received in its opening 28, such that the heat shield 16 provides an integral splashplate/centerbody design. A passage 26 is formed within each centerbody 20 to direct cooling air downstream of the primary combustion zones 24b of the mixer 14b through outlets at the distal ends of the centerbodies 20. In addition, the heat shield 16 preferably includes multiple cooling passages 48, 50, 52 and 54 formed in the base 30, through the rim 42 of the base 30, through the rim 46 of the opening 28, and through the inner walls of the centerbodies 20, respectively, in order to enhance heat transfer. In particular, these cooling holes 48–54 reduce the bulk temperature of the heat shield 16, such that fillet stresses are reduced.

As is apparent from the above, the heat shield 16 has a complicated geometry, and is therefore susceptible to both thermal and acoustic stresses induced by the operating environment of the combustor 10. In contrast to the prior art, which has generally advocated the use of ceramic materials in order to withstand the high temperatures within a gas turbine engine combustor, heat shield members 16 in accordance with this invention are single crystal superalloy investment castings. Though it is foreseeable that various superalloys could be found suitable as the material for the heat shield 16 of this invention, a preferred material is Rene N5, having a nominal composition in weight percent of about 7.5 cobalt, about 7 chromium, about 1.5 molybdenum, about 5 tungsten, about 3 rhenium, about 6.5 tantalum, about 6.2 aluminum, about 0.15 hafnium, about 0.05 carbon, about 0.004 boron, and about 0.01 yttrium, with the balance being essentially nickel and incidental impurities. Rene N5 is particularly preferred for its high cycle fatigue properties and mechanical properties at temperatures of about 1000° to 1100° C. (about 1800° to 2000° F.). To withstand the high service temperatures within a combustor, the superalloy heat shield 16 is preferably coated with a thermal barrier coating (TBC), which can be generally of any suitable type known in the art. The cooling holes 26 and 48–54 formed in the base 30, rims 42 and 46, and centerbodies 20 promote a longer service life for the thermal barrier coating by reducing the bulk temperature of the heat shield 16.

According to this invention, to achieve an acceptable level of durability for the superalloy heat shield 16, the primary and secondary crystal orientation of the single crystal casting must be controlled to attain a balance between the ability to withstand thermally-induced stresses and those stresses induced by high levels of acoustic energy, particularly those high levels caused by the combustor 10 operating with a lean fuel/air ratio. As shown in FIG. 3b, the primary crystal orientation 38 of the casting is substantially parallel to the axial axis A of the heat shield 16. According to the invention, primary crystal orientation 38 is controlled to promote the mechanical and thermal properties of the centerbodies 20 in the axial direction, thereby promoting the durability and service life of the centerbodies 20. Such an orientation also promotes the castability of the heat shield 16. However, it is within the scope of this invention that the primary crystal orientation 38 of the heat shield 16 could be angularly offset from the axial axis A in order to further optimize the properties of the heat shield 16.

The secondary crystal orientation 40 of the casting lies in the plane of the base 30 and normal to the primary crystal orientation 38. According to this invention, the secondary crystal orientation 40 must be angularly offset from the radial axis B of the heat shield 16 to reduce stresses and control the Youngs modulus in the fillets 36 between the base 30 and the centerbodies 20. More specifically, such an angular offset of the secondary crystal orientation 40 has been determined to reduce stress levels in the fillets 36 while maintaining acceptable frequency response characteristics for the heat shield 16, such that the overall durability of the heat shield 16 is superior to prior art one-piece and segmented heat shields. Importantly, the secondary crystal orientation 40 of the single crystal casting must provide a balance between the natural frequency of the heat shield 16 and thermally and acoustically-induced stress levels. Specifically, though an angular offset of the secondary crystal orientation 40 has been determined to increase the natural frequency of the heat shield 16, i.e., further from to the excitation frequency of the combustor 10, higher thermal stresses in the fillets 36 have been observed for a given temperature gradient. As such, the additional cooling passages 48, 50, 52 and 54 shown in FIGS. 2, 3*a* and 3*b* are preferably provided to reduce thermal stresses.

As represented in FIG. 3*a*, the secondary crystal orientation 40 is offset by an angle $\alpha$ from the radial axis B of the heat shield 16. While the angular offset is shown in FIG. 3*a* as being to one side of the radial axis B, the direction of the offset relative to the axis B is not critical. To achieve the desired properties for the heat shield 16 noted above, a suitable range for $\alpha$ is up to about 30 degrees, with a preferred orientation being about fifteen degrees from the radial axis B. As is known by those skilled in the art, the above preferred crystal orientations 38 and 40 can be achieved by appropriately "seeding" the investment pattern with a grain selector having the desired orientation. The combined effect of the primary and secondary crystal orientations 38 and 40 has been determined to sufficiently reduce stress levels in the heat shield 16 to the extent that the durability of the member 16 with respect to thermally and acoustically-induced stresses is enhanced, such that the overall durability of the annular segmented heat shield 16*b* is superior to prior art one-piece heat shields and segmented heat shields formed from ceramics.

While the invention has been described in terms of a preferred embodiment, other forms could be adopted by one skilled in the art, such as by substituting other alloys, employing various casting techniques, and altering the configuration of the heat shield. Accordingly, the scope of our invention is to be limited only by the following claims.

What is claimed is:

1. A heat shield member of a segmented heat shield for a gas turbine engine combustor having a concentrically-disposed annular array of air/fuel mixers, the heat shield member having a radial axis and an axial axis normal to and intersecting the radial axis, the heat shield member comprising:

a base portion in a radial plane of the heat shield member, the base portion having a radially-outward first end and a radially-inward second end; and a wall portion extending axially from one of the first and second ends of the base portion;

wherein the heat shield member is a single crystal superalloy casting having a primary crystal orientation and a secondary crystal orientation, the primary crystal orientation being substantially parallel to the axial axis of the heat shield member, the secondary crystal orientation being in the radial plane of the heat shield member.

2. A heat shield member as recited in claim 1 wherein the base portion has an opening disposed between the first and second ends, the opening having an axis that is approximately parallel to the axial axis of the heat shield member and normal to the radial plane of the heat shield member.

3. A heat shield member as recited in claim 1 wherein the wall portion extends from the first end of the base portion, the heat shield member further comprising a second wall portion extending axially from the second end of the base portion so as to face the wall portion extending axially from the first end of the base portion.

4. A heat shield member as recited in claim 1 wherein the secondary crystal orientation is offset up to about thirty degrees from the radial axis of the heat shield member.

5. A heat shield member as recited in claim 1 wherein the secondary crystal orientation is offset about fifteen degrees from the radial axis of the heat shield member.

6. A heat shield member as recited in claim 1 wherein the base portion is substantially planar.

7. A heat shield member as recited in claim 1 wherein the base portion further includes opposing lateral edges extending between the first and second ends of the base portion, the lateral edges being nonparallel to each other.

8. A heat shield member as recited in claim 1 wherein the base and wall portions have cooling passages formed therethrough.

9. A heat shield member as recited in claim 1 wherein the wall portion is adapted to serve as a splashplate for at least one of the concentrically-disposed annular array of air/fuel mixers.

10. A heat shield member as recited in claim 1 wherein the superalloy consists essentially of, in weight percent, about 7.5 cobalt, about 7 chromium, about 1.5 molybdenum, about 5 tungsten, about 3 rhenium, about 6.5 tantalum, about 6.2 aluminum, about 0.15 hafnium, about 0.05 carbon, about 0.004 boron, and about 0.01 yttrium, with the balance being essentially nickel and incidental impurities.

11. An annular-shaped segmented heat shield for a gas turbine engine combustor having a concentrically-disposed annular array of air/fuel mixers, the segmented annular heat shield having a radially-outward perimeter defined by a first annular-shaped segmented centerbody and a radially-inward perimeter defined by a second annular-shaped segmented centerbody, the annular-shaped segmented heat shield comprising a plurality of heat shield members, each of the heat shield members comprising:

a base portion in a radial plane of the heat shield member, the base portion having a radially-outward first end, a radially-inward second end, and an opening disposed between the first and second ends, the opening defining an axial axis of the heat shield member that is substantially normal to the radial plane, the base portion having a radial axis in the radial plane and intersecting the axial axis;

a first arcuate wall portion extending axially from the first end of the base portion and forming a segment of the first annular-shaped segmented centerbody of the annular-shaped segmented heat shield, a first fillet being disposed between the first wall portion and the base portion, a cooling passage being disposed within the first arcuate wall portion and forming an outlet at a distal end of the first arcuate wall portion; and a second arcuate wall portion extending axially from the second end of the base portion and forming a segment of the second annular-shaped segmented centerbody of the annular-shaped segmented heat shield, a second fillet being disposed between the second wall portion and the base portion, a cooling passage being disposed within the second arcuate wall portion and forming an outlet at a distal end of the second arcuate wall portion;

wherein each of the heat shield members is a single crystal superalloy casting having a primary crystal orientation and a secondary crystal orientation, the primary crystal orientation being substantially parallel to the axial axis of the heat shield member, the secondary crystal orientation being in the radial plane of the heat shield member.

12. An annular-shaped segmented heat shield as recited in claim 11 wherein the first annular-shaped segmented centerbody is substantially concentric with the second annular-shaped segmented centerbody.

13. An annular-shaped segmented heat shield as recited in claim 11 wherein the primary crystal orientation is offset up to about thirty degrees from the radial axis of the heat shield member.

14. An annular-shaped segmented heat shield as recited in claim 11 wherein the superalloy consists essentially of, in weight percent, about 7.5 cobalt, about 7 chromium, about 1.5 molybdenum, about 5 tungsten, about 3 rhenium, about 6.5 tantalum, about 6.2 aluminum, about 0.15 hafnium, about 0.05 carbon, about 0.004 boron, and about 0.01 yttrium, with the balance being essentially nickel and incidental impurities.

15. An annular-shaped segmented heat shield as recited in claim 11 wherein the base portion is substantially planar.

16. An annular-shaped segmented heat shield as recited in claim 11 wherein the base portion further includes opposing lateral edges extending between the first and second ends of the base portion, the lateral edges diverging from each other.

17. An annular-shaped segmented heat shield as recited in claim 11 wherein the base and wall portions have a plurality of passage formed therein.

18. An annular-shaped segmented heat shield as recited in claim 11 wherein the wall portion is adapted to serve as a splashplate for at least one of the concentrically-disposed annular array of air/fuel mixers.

19. A method for reducing stresses in a heat shield member of a segmented heat shield for a gas turbine engine combustor having a concentrically-disposed annular array of air/fuel mixers and operating with a lean fuel mixture, the method comprising the steps of:

casting the heat shield member from a superalloy such that the heat shield member includes:

a base portion disposed in a radial plane of the heat shield member, the base portion having a radially-outward first end, a radially-inward second end, and an opening disposed between the first and second ends, the opening defining an axial axis of the heat shield member that is substantially normal to the radial plane, the base portion having a radial axis in the radial plane and intersecting the axial axis;

a first wall portion extending axially from the first end of the base portion; and controlling the casting step such that the heat shield member is a single crystal casting having a primary crystal orientation and a secondary crystal orientation, the primary crystal orientation being substantially parallel to the axial axis of the heat shield member, the secondary crystal orientation being in the radial plane of the heat shield member.

20. A method as recited in claim 19 wherein the secondary crystal orientation is offset up to about thirty degrees from the radial axis of the heat shield member.

* * * * *